US011250059B2

(12) United States Patent
Delamare et al.

(10) Patent No.: US 11,250,059 B2
(45) Date of Patent: Feb. 15, 2022

(54) OPTIMIZING GRAPH QUERIES BY PERFORMING EARLY PRUNING

(71) Applicant: ORACLE INTERNATIONAL CORPORATION, Redwood Shores, CA (US)

(72) Inventors: Arnaud Delamare, Zurich (CH); Vasileios Trigonakis, Zurich (CH); Jean-Pierre Lozi, Zurich (CH); Vlad Ioan Haprian, Zurich (CH); Petr Koupy, Blansko (CZ); Hassan Chafi, San Mateo, CA (US); Sungpack Hong, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 173 days.

(21) Appl. No.: 16/738,972

(22) Filed: Jan. 9, 2020

(65) Prior Publication Data

US 2021/0216590 A1 Jul. 15, 2021

(51) Int. Cl.
*G06F 16/00* (2019.01)
*G06F 16/901* (2019.01)
(Continued)

(52) U.S. Cl.
CPC ...... *G06F 16/9024* (2019.01); *G06F 16/2454* (2019.01); *G06F 16/9032* (2019.01); *G06F 16/90335* (2019.01)

(58) Field of Classification Search
CPC .............. G06F 16/9024; G06F 16/2454; G06F 16/9032; G06F 16/90335
(Continued)

(56) References Cited

U.S. PATENT DOCUMENTS 6,092,062 A * 7/2000 Lohman ............ G06F 16/24542
9,135,565 B1 9/2015 Khalefa
(Continued)

FOREIGN PATENT DOCUMENTS

CN 110427359 A 11/2019
CN 110609911 A 12/2019
(Continued)

OTHER PUBLICATIONS

Lyu et al., "DBL: Reachability Queries on Dynamic Graphs", Technical Report, dated Jan. 4, 2019, 27 pages.
(Continued)

*Primary Examiner* — Chelcie L Daye
(74) *Attorney, Agent, or Firm* — Hickman Becker Bingham Ledesma LLP

(57) ABSTRACT

Techniques are described herein for early pruning of potential graph query results. Specifically, based on determining that property values of a path through graph data cannot affect results of a query, the path is pruned from a set of potential query solutions prior to fully exploring the path. Early solution pruning is performed on prunable queries that project prunable functions including MIN, MAX, SUM, and DISTINCT, the results of which are not tied to a number of paths explored for query execution. A database system implements early solution pruning for a prunable query based on intermediate results maintained for the query during query execution. Specifically, when a system determines that property values of a given potential solution path cannot affect the query results reflected in intermediate results maintained for the query, the path is discarded from the set of possible query solutions without further exploration of the path.

22 Claims, 9 Drawing Sheets

(51) Int. Cl.
    *G06F 16/2453* (2019.01)
    *G06F 16/903* (2019.01)
    *G06F 16/9032* (2019.01)

(58) Field of Classification Search
    USPC ........................................................ 707/798
    See application file for complete search history.

(56) References Cited

U.S. PATENT DOCUMENTS

| | | | |
|---|---|---|---|
| 9,165,283 | B2 | 10/2015 | Scheidl et al. |
| 10,445,319 | B2* | 10/2019 | Weld ..................... G06F 16/252 |
| 2006/0256797 | A1 | 11/2006 | Bernabeu-Auban et al. |
| 2012/0109889 | A1 | 5/2012 | Wu |
| 2015/0261817 | A1 | 9/2015 | Harris |
| 2017/0118042 | A1 | 4/2017 | Bhattacharya |
| 2017/0147644 | A1* | 5/2017 | Lee ......................... G06F 16/00 |
| 2019/0205178 | A1 | 7/2019 | Lee et al. |
| 2019/0370695 | A1 | 12/2019 | Chandwani |
| 2020/0117762 | A1 | 4/2020 | Haprian et al. |
| 2021/0089580 | A1 | 3/2021 | Deng |
| 2021/0240705 | A1 | 8/2021 | Trigonakis |

FOREIGN PATENT DOCUMENTS

| | | |
|---|---|---|
| JP | 2016106329 A | 6/2016 |
| WO | WO2019218814 A1 | 11/2019 |

OTHER PUBLICATIONS

Amazon Neptune "Features", https://aws.amazon.com/neptune/, 8 pages, last viewed on Mar. 9, 2020.
Amazon Neptune, "Overview", https://aws.amazon.com/neptune/, last viewed on Mar. 9, 2020, 16 pages.
Apache Spark, "GraphX", Spark 2.3.4 released (/news/spark-2-3-4-released.html), dated Sep. 9, 2019, 3 pages.
Cong et al., "Solving Large, Irregular Graph Problems using Adaptive Work-stealing", dated 2008, 10 pages.
Dekel et al., "Cachesensitive Optimization of Immutable Graph Taversals (CS745 Project Report)", ACM, dated 2015, 9 pages.
18C Oracle, "Spatial and Graph Analytics with Oracle Database 18c", White Paper, dated Feb. 2018, 32 pages.
Hodler et al., "An Overview of Graph Algorithms in Neo4j", Neo4j, White Paper, dated 2018, 10 pages.
Zhang et al., "REGTT: Accelerating Tree Traversals on GPUs by Exploiting Regularities", dated 2016, 10 pages.
Neo4j, "Graph and Machine Learning Algorithms", dated 2019, 9 pages.
Oracle, "Oracle Big Data Appliance X7-2", dated 2017, 10 pages.
PGQL, "Property Graph Query Language", Oracle, dated 2019, 5 pages.
Priya et al., "A Survey on Realizing Memory-Optimized Distributed Graph Processing", IOSR Journal of Engineering (IOSRJEN), vol. 8, Issue 8 dated Aug. 2018, 7 pages.
Rest, Oskar van et al., "PGQL: a Property Graph Query Lanuage", ACM, dated 2016, 6 pages.

Viehmann et al., "Introduction to Graph Analytics and Oracle Cloud Service", dated Oct. 22, 2018, 43 pages.
Gonzalez et al., "GraphX: Graph Processing in a Distributed Dataflow Framework", dated 2014, 15 pages.
Rowe, Walker, BMC blogs, "Introduction to the Neo4j Graph Database", Mar. 21, 2019, https://www.bmc.com/blogs/neo4j-graph-database/, 19pgs.
Amazon Neptune, Fast Reliable Graph Database Built for the Cloud, www.aes.amazon.com/neptune, Nov. 29, 2017, 20 pages.
ArangoDB, "Distributed Iterative Graph Processing", Jun. 26, 2017, 8 pages.
Databricks, "Graph Analysis Tutorial With GraphFrames", dated Mar. 17, 2019, 2 pages.
Elshawi et al., "Big Graph Processing Systems: State-of-the-art and Open Challenges", dated 2015 IEEE First International Conference on Big Data Computing Service and Applications, 10 pages.
Harris, Tim, "Callisto-RTS: Fine-Grain Parallel Loops", dated Jul. 2015, 13 pages.
Ingalls et al., "Eliminating Canceling Edges From the Simulation Graph Model Methodology", Proceedings of the 1996 Winter Simulation Confrence, dated 1996, 8 pages.
Jin et al., "3-HOP: A High Compression Indexing Scheme for Reachability Query", SIGMOD'09, Jun. 29-Jul. 2, 2009, Providence, Rhode Island, USA, 14 pages.
Adcock et al., "Evaluating OpenMP Tasking at Scale for the Computation of Graph Hyperbolicity", IWOMP dated 2013, 13 pages.
Morishima et al., "Performance Evaluations of Graph Database using CUDA and OpenMP Compatible Libraries", ACM SIGARCH Computer Architecture News, dated Jun. 2014, 6 pages.
Tigergraph's Native Parallel Graph, dated 2020, 2 pages.
PGQL 1.2 Specification, "Property Graph Query Language", dated Feb. 20, 2019, 79 pages.
Roth et al., "PGX.D/Async: A Scalable Distributed Graph Pattern Matching Engine", dated 2017 Publication rights licensed to ACM, 6 pages.
Sakr et al., "Large Scale Graph Processing Using Apache Giraph", dated Mar. 20, 2017, 244 pages.
Salihoglu et al. "GPS: A Graph Processing System", SSDBM: Proceedings of the 25th International Conference on Scientific and Statistical Database Management, dated Jul. 2013, 31 pages.
Spark 2.3.4, "GraphX Programming Guide", Sep. 9, 2019, 23 pages.
Tada et al., "On the Robustness of the Soft State for Task Scheduling in Large-scale Distributed Computing Environment", IEEE, dated 2008, 7 pages.
Tiger Graph, "Cool Vendor in Data Management", Advanced Analytics on Connected Data, dated 2020, 3 pages.
Low et al. "GraphLab: A New Framework For Parallel Machine Learning", dated 2014, 10 pages.
Trigonakis, U.S. Appl. No. 16/778,668, filed Jan. 31, 2020, Non-Final Rejection dated Oct. 1, 2021.
Riggan, Taylor, et al., "Using SPARQL explain to understand query execution in Amazon Neptune", AWS Database Blog, https://aws.amazon.com/blogs/database/using-sparql-explain-to-understand-query-execution-in-amazon-neptune/, Sep. 17, 2019, 10pgs.
Amazon Neptune Features, www.aws.amazon.com/neptune/features/, printed on Oct. 7, 2021, 8 pages.

* cited by examiner

FIG. 1

Query 100

SELECT MAX(a.age) MATCH (a) -> (b) WHERE b.age > 40

Query 102

SELECT a.age, b.age, MIN(c.age), d.age MATCH
(a) -> (b) -> (c) -> (d) WHERE d.age > 40

Query 104

SELECT MAX(a.age), SUM(b.age), 42 MATCH (a) -> (b) -> (c)
WHERE c.age > 40

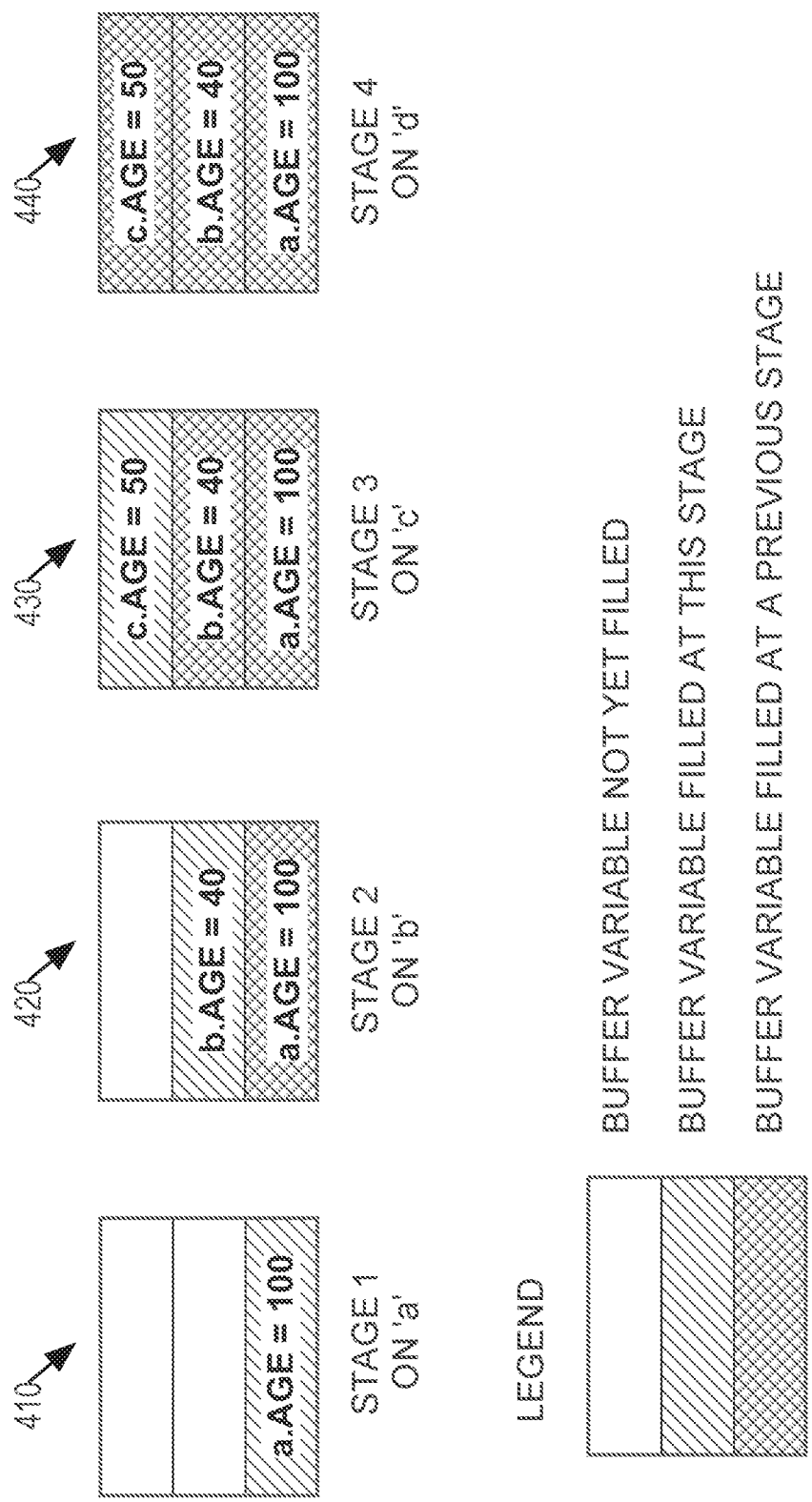

502 — EXECUTE A QUERY, AS A PRUNABLE QUERY, OVER GRAPH DATA MAINTAINED IN A GRAPH DATABASE, WHERE THE GRAPH DATA COMPRISES A PLURALITY OF VERTICES AND A PLURALITY OF EDGES THAT REPRESENT RELATIONSHIPS BETWEEN THE PLURALITY OF VERTICES, WHERE THE QUERY INCLUDES A PRUNABLE EXPRESSION OVER A PARTICULAR VERTEX PROPERTY, AND WHERE THE GRAPH DATABASE IS MAINTAINED, AT LEAST IN PART, BY A PARTICULAR COMPUTING DEVICE

504 — THE PARTICULAR COMPUTING DEVICE DETERMINING THAT A FIRST PATH, THROUGH THE GRAPH DATA, SATISFIES THE QUERY

506 — BASED AT LEAST IN PART ON A FIRST VALUE, OF THE PARTICULAR VERTEX PROPERTY, OF A VERTEX IN THE FIRST PATH, THE PARTICULAR COMPUTING DEVICE DERIVING INTERMEDIATE RESULTS FOR THE PRUNABLE EXPRESSION

508 — THE PARTICULAR COMPUTING DEVICE DETERMINING THAT A SECOND VALUE, OF THE PARTICULAR VERTEX PROPERTY, OF A PREVIOUSLY-UNEXPLORED VERTEX IN THE GRAPH DATA DOES NOT AFFECT THE INTERMEDIATE RESULTS FOR THE PRUNABLE EXPRESSION

510 — IN RESPONSE TO DETERMINING THAT THE SECOND VALUE DOES NOT AFFECT THE INTERMEDIATE RESULTS FOR THE PRUNABLE EXPRESSION, THE PARTICULAR COMPUTING DEVICE DISCARDING THE PREVIOUSLY-UNEXPLORED VERTEX FROM A SET OF POTENTIAL SOLUTIONS FOR THE QUERY

FIG. 7
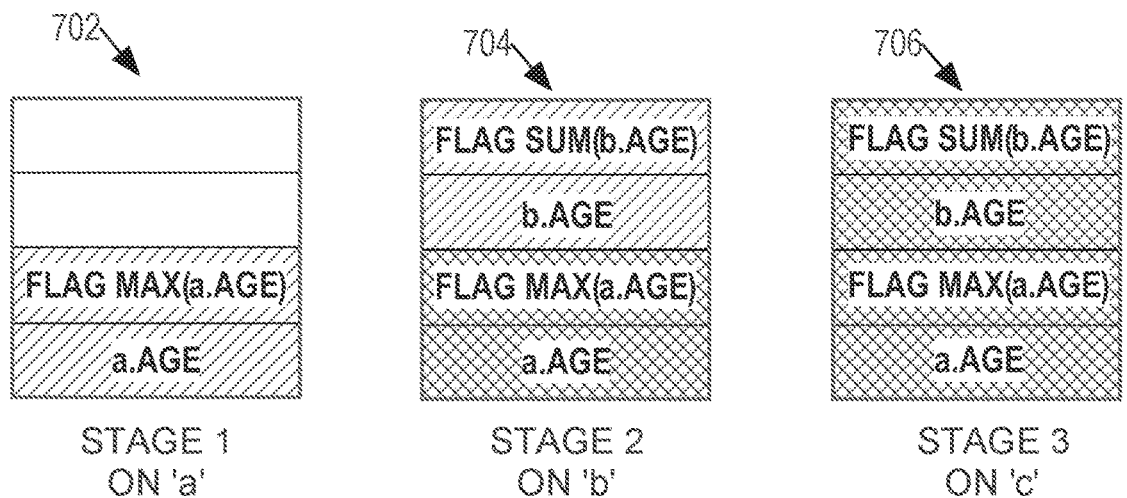
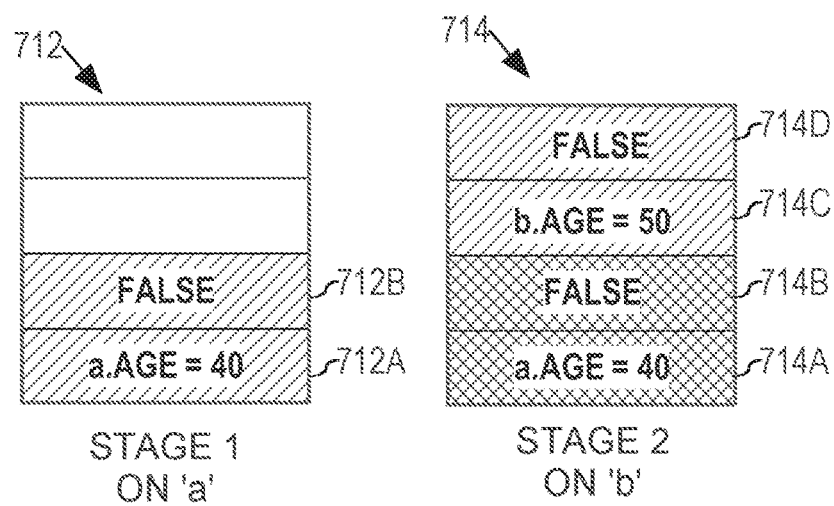
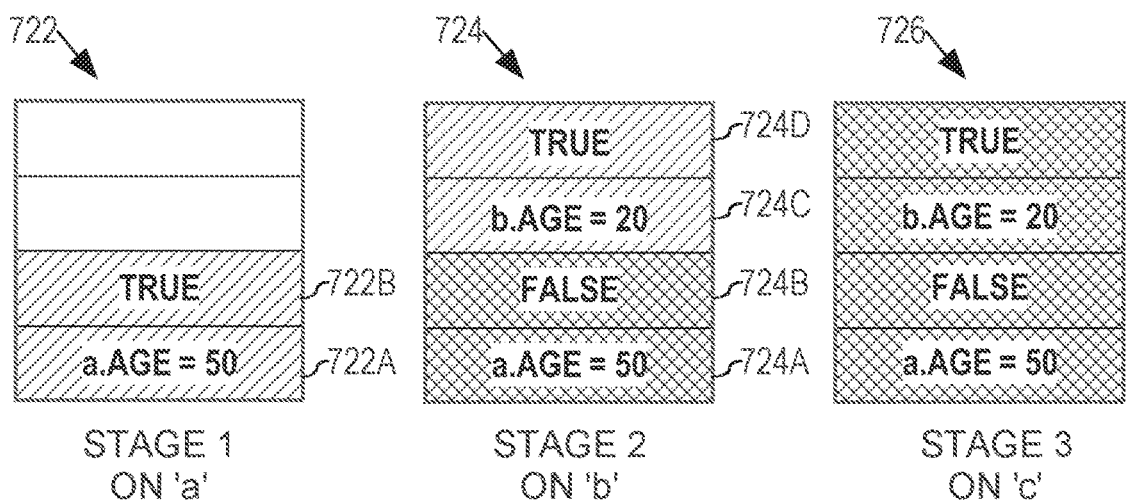

OPTIMIZING GRAPH QUERIES BY PERFORMING EARLY PRUNING

FIELD OF THE INVENTION

The present invention relates to querying graph database data and, more specifically, to optimizing implementation of graph data queries by using early pruning to discard potential solution paths that cannot affect query results.

BACKGROUND

Graph processing is a method in data processing where the fine-grained relationships between data entities are materialized, in a graph database, as graph edges (or simply "edges") between graph vertices (or simply "vertices"). Graph databases may be implemented by single-node database systems, multi-node shared-memory database systems, multi-node distributed-memory database systems, multi-tenant database systems, etc. Information about the entities, represented by vertices, and relationships between the entities, represented by edges, may be queried and analyzed to gain insights into the represented data.

The most prominent model of representing graph data is the "property-graph model". In the property-graph model, both vertices and edges that represent connections between the vertices can be associated with properties. For example, in particular property-graph modeled graph data, a vertex has a property, 'age', with an integer value, such as '20'. A graph query may be run over the particular graph data to analyze the represented information, e.g., a query that returns the maximum value of the 'age' property of vertices that have an outgoing neighbor with a value of the 'age' property that is greater than 40.

Herein, graph queries are represented using property graph query language (PGQL), which is a graph query language with a syntax close to structured query language (SQL). (Additional information about PGQL can be found in "PGQL: a Property Graph Query Language", by Oskar van Rest et al., GRADES 2016, Jun. 24, 2016, the entire contents of which is incorporated by reference as if fully set forth herein.) To illustrate, the query described above can be expressed in PGQL as query 100 of FIG. 1. Note that the construct (a)→(b) in query 100 is referred to herein as the query path pattern.

Graph data tends to be very extensive. As such, efficient execution of graph queries is important to successful graph database implementations. Further, performance is a critical point of graph database and analysis infrastructures, where large delays in query response time can make the difference between commercial success and failure.

Graph query execution within a single-node database system or a multi-node shared-memory database system is generally much more efficient than query execution within a distributed database system because execution of graph queries on a distributed system generally requires communication among the different machines implementing the system. Such communication subjects query execution to network latencies, which generally represent a bottleneck for query execution. For example, if vertices of particular graph data are maintained by different machines, where a particular vertex is stored on machine A and its neighbor is stored on machine B, execution of query 100 (FIG. 1) against this path requires machine A to send information regarding the particular vertex to machine B (in this case, the value of 'a.age').

Many techniques to speed up graph query execution are helpful for all implementations of graph databases. For example, indices can be used to speed up query execution. Also, intelligent query planning can reduce the number of paths that need to be explored for a given query. An example of intelligent query planning is starting exploration of potential solutions for query 100 from vertices corresponding to vertex 'b' in the query 100 path pattern, which eliminates the need to explore paths that do not satisfy the filter over vertex 'b'. This technique of intelligent query planning can reduce the number of inter-machine hops required to explore the graph data when the graph database is implemented in a distributed database system. Another technique for mitigating inter-machine communication-based latency, for a distributed system, is grouping inter-machine messages. Grouping of messages enables sending large chunks of information in large packet groups instead of sending many smaller information packets between the machines.

Furthermore, the evaluation of queries on any implementation of a graph database may be performed in an asynchronous manner, where machines and threads need not wait for completion of a given query execution stage across all potentially-matching vertices in the graph data before starting the execution of a subsequent query execution stage. Specifically, in asynchronous query execution, threads of the database system pick up work (e.g., testing filters, sending data to another machine for a distributed system, etc.) independently from other threads. The main benefit of asynchronous query execution is the reduced memory footprint of the query, given that the query execution engine need not store all intermediate results of earlier query execution stages for all explored vertices to facilitate performance of subsequent query execution stages. Thus, asynchronous query execution allows graph database systems to more efficiently execute queries that would otherwise use a tremendous amount of memory in maintaining intermediate query results.

Notwithstanding existing techniques to improve the execution time of queries in graph database systems, it would be beneficial for any implementation of a graph database management system to further optimize execution of graph data queries by reducing the size of the set of explored paths.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 1 depicts example graph data queries.

FIG. 4 depicts message buffers with path-specific intermediate results for various stages of query execution.

FIG. 5 depicts a flowchart for performing early solution pruning by utilizing expression-specific intermediate results to eliminate, from a set of potential query solutions, paths whose property values cannot influence the final result of the query.

FIG. 7 depicts message buffers with path-specific intermediate results for various stages of query execution and boolean flags associated with values stored in the buffers.

DETAILED DESCRIPTION

Figure 2:
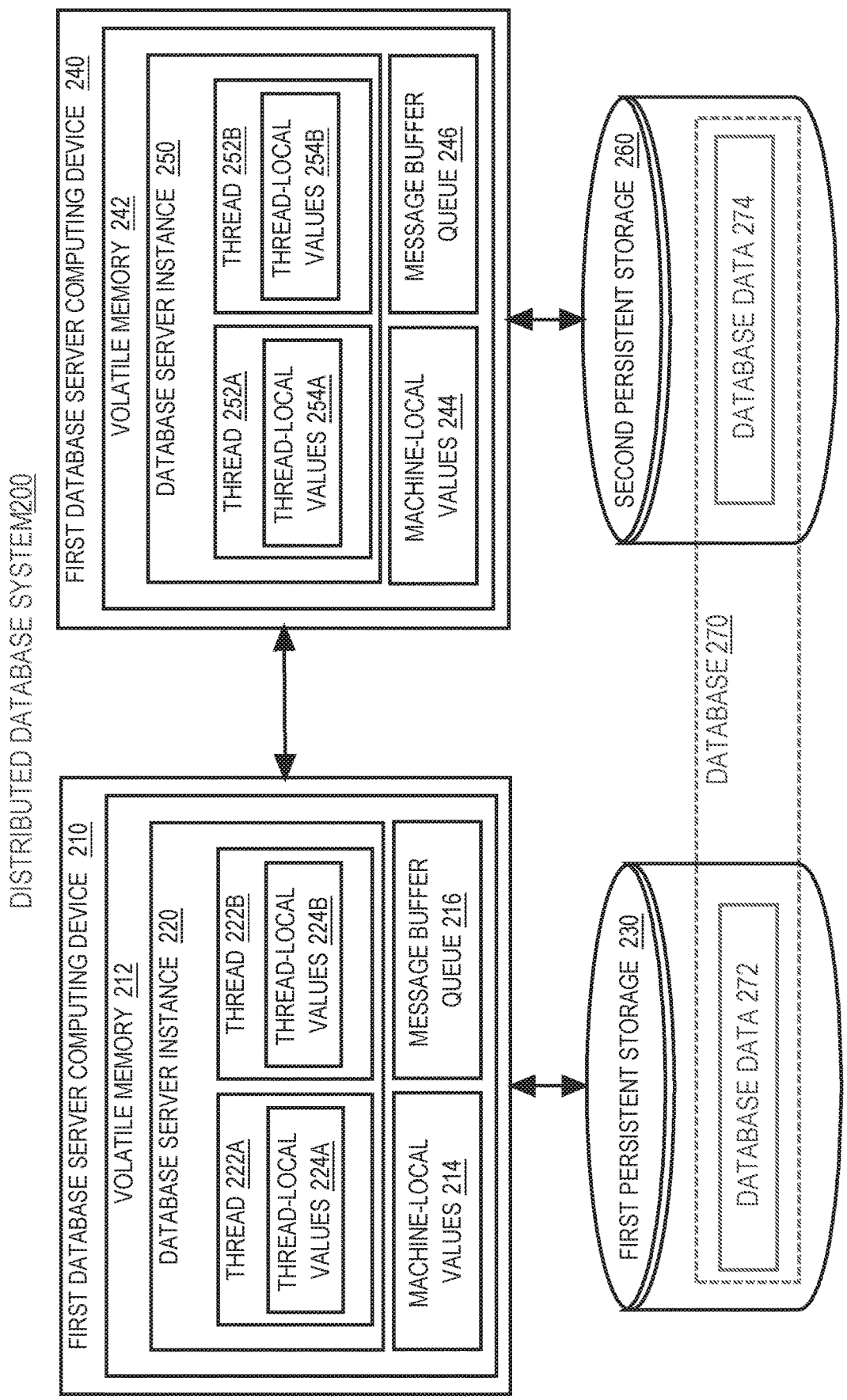
FIG. 2 is a block diagram that depicts an example arrangement for a database management system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for early pruning of potential graph query results to increase the efficiency of graph query execution. Specifically, based on determining that one or more paths through graph data that represent potential solutions to a query cannot affect the results of the query, those paths are pruned from the set of potential query solutions prior to fully exploring the paths.

Early solution pruning is performed on prunable queries, the results of which are not tied to a number of paths explored for query execution. More specifically, the results of prunable queries are determined using prunable expressions, which employ one or more of a set of prunable functions that includes: MIN and MAX (with or without GROUP BY); SUM (with or without GROUP BY); and DISTINCT. Once a database system has determined that a given query is prunable based on the projected expressions of the query being prunable, the system uses intermediate results maintained for the query during query execution to implement early solution pruning. When the system determines that property values of a given potential solution path cannot affect the query results reflected in intermediate results maintained for the query, the path is discarded from the set of possible query solutions without further exploration of the path.

For example, a database server instance executes query 100 (FIG. 1) against a graph database. At a given point in time, the database server instance maintains expression-specific intermediate results indicating that the current 'MAX(a.age)' encountered by the instance is '100'. Based on such intermediate results, the database server instance is able to determine that any potential solution path that has vertex 'a', according to the query 100 path pattern, with a value of the 'age' property that is less than '100' cannot affect the final query result. Such potential solution paths can be discarded from the set of possible solutions for query 100 without further analysis of the paths.

Early pruning of potential solutions for prunable queries improves query response times and reduces hardware and energy costs. In the context of a distributed system, early solution pruning also decreases the volume of inter-machine communication, which alleviates network congestion that is often a limiting factor in distributed systems. The performance gains resulting from application of techniques described herein are especially noticeable when exploration of pruned paths would require inter-machine communication and when paths are pruned before requiring exploration of a large number (e.g., several thousands) of hops.

Distributed Graph Data

Embodiments herein are described in the context of a distributed database system 200 comprising multiple database server instances that maintain database data on disks that are not shared among the multiple database server instances, as depicted in FIG. 2. Nevertheless, techniques described herein for early solution pruning may be performed by any implementation of a database system, e.g., on a single-node database system that comprises a single database server instance, one a multi-node shared-memory database system that comprises multiple database server instances that access the same shared storage, on a multi-tenant database system comprising a single database server instance that serves multiple distinct databases, etc.

FIG. 2 depicts an example distributed database system 200 comprising a first database server instance 220 running on a first database server computing device 210, and a second database server instance 250 running on a second database server computing device 240. Instances 220 and 250 maintain portions of a graph database 270, i.e., database data 272 maintained in persistent storage 230 by instance 220, and database data 274 maintained in persistent storage 260 by instance 250. Examples of graph database implementations include Spatial and Graph Analytics Oracle RDBMS, Big Data Appliance, Parallel Graph AnalytiX (PGX), and Oracle Graph Cloud Service. (More information regarding Spatial and Graph Analytics Oracle RDBMS may be found in "Spatial and Graph Analytics with Oracle Database 18c", an Oracle White Paper, February 2018, the entire contents of which are hereby incorporated as if fully set forth herein.)

Figure 3:
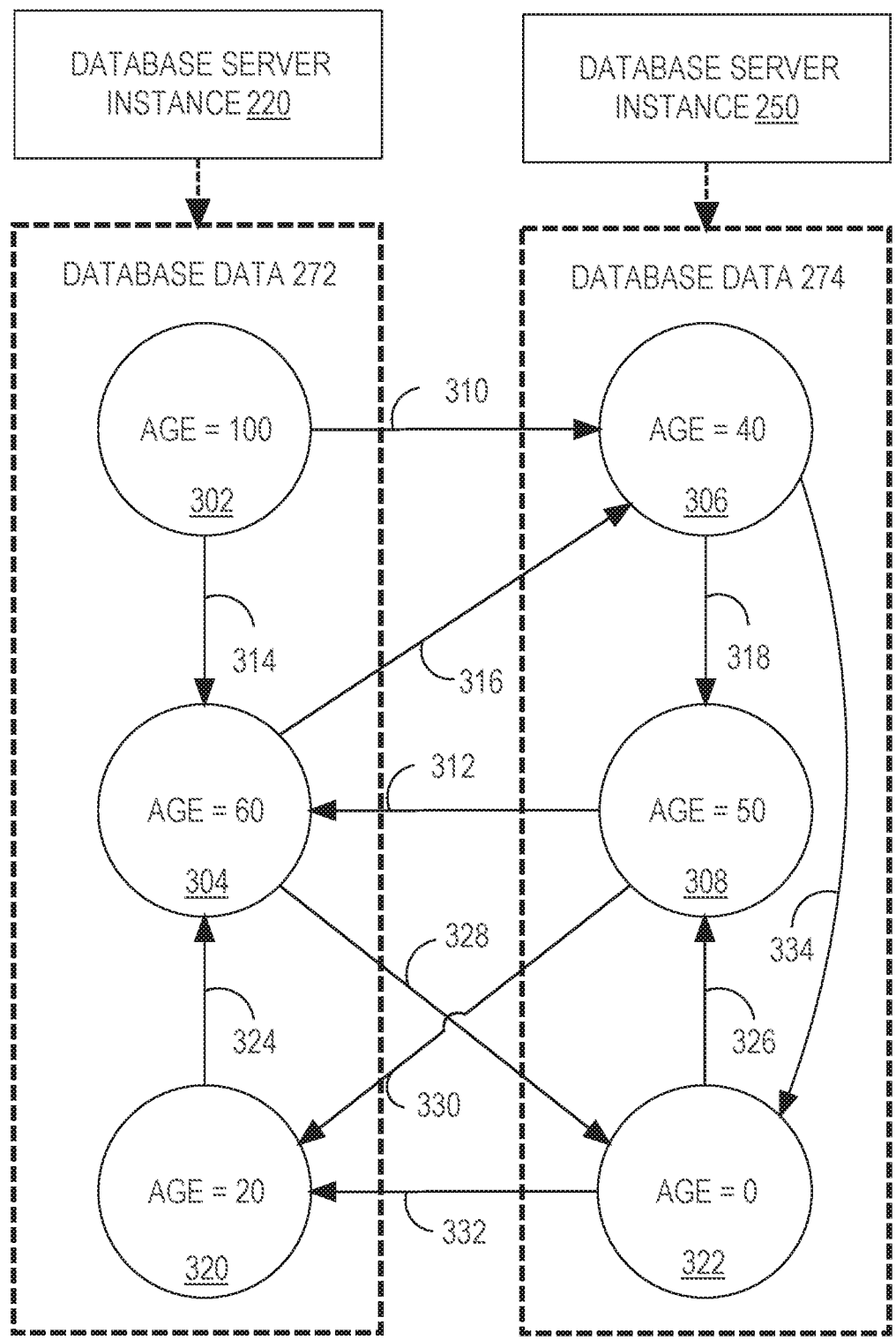
FIG. 3 depicts example graph data.

FIG. 3 depicts example graph data from database 270. Herein, a machine "owns" data that is maintained by a database server instance running on the machine. Thus, the vertices and edges defined in database data 272 are "owned" by computing device 210, and the vertices and edges defined in database data 274 are "owned" by computing device 240. According to a non-limiting embodiment, an edge is owned by the machine that owns the source vertex of the edge. Thus, the owner of an edge maintains an identifier of a destination vertex of the edge, and an identifier of the owner of the destination vertex, as well as any properties of the edge. To illustrate in the context of FIG. 3, device 210 owns vertices 302, 304, and 320 and edges 310, 314, 316, 324, and 328, and device 240 owns vertices 306, 308, and 322 and edges 312, 318, 326, 330, 332, and 334. Information for an edge (such as an identifier of the source vertex of the edge, and an identifier of the owner of the source vertex) may also be stored with the destination vertex of the edge as a "reverse" edge.

Querying Graph Data

Execution a query against database 270 is split into one or more execution stages, where each stage of query execution comprises one of (a) exploration of a hop (going from one vertex to another) in a path that is a potential solution for the query, or (b) processing of a final vertex in a path that is a potential solution for the query. These stages may be performed asynchronously and in parallel by multiple processing entities, e.g., multiple instances of a multi-node database system, multiple threads on a single-node database system, multiple threads running on multiple machines of a multi-node database system, etc. References to "processing entities" herein refer to computer system processes, threads running within a computer system process, and/or database server instances, depending upon implementation.

In the context of distributed system 200 depicted in FIG. 2, both machines initiate path exploration for a given query on every vertex that the machine owns, excluding any vertices that are determined to be excluded by the query. At each stage of query execution, if property values of a given path do not match query requirements, the processing entity ceases exploration of the path and discards the path from the set of potential query solutions.

To illustrate, database system 200 receives a query 102 (FIG. 1) over database 270. The path pattern for query 102 is (a)→(b)→(c)→(d). Note that query 102 is not prunable, as described in further detail below. Database system 200 organizes execution of query 102 into four execution stages illustrated in FIG. 4, where each stage corresponds to a corresponding vertex in the query 102 path pattern. In this case, because there are no limitations on vertex 'a' in the query 102 path pattern, database system 200 causes the first execution stage of query 102 to be initiated for all vertices in database 270.

As a further illustration, during the first stage of query 102 execution (corresponding to vertex 'a' in the query path pattern), thread 222A, of database server instance 220, performs a look up of the value of the 'age' property of vertex 302 in database data 272 ('age'='100'), and inserts the 'age' property value into a message buffer 410 that is allocated to store path-specific intermediate results for query 102. Thread 222A then looks up the neighbors of vertex 302 (i.e., destination vertices for edges that originate with vertex 302), which are vertex 304 (connected by edge 314) and vertex 306 (connected by edge 310). Device 210 sends a copy of message buffer 410 to the owner machine of each neighbor of vertex 302 with information identifying the target neighbor vertex for the second phase of query 102 processing (corresponding to vertex 'b' in the query path pattern). Thus, thread 222A sends a copy of message buffer 410 to device 240 with information identifying vertex 306, and also causes message buffer 410 to be stored, with information identifying vertex 304, in a buffer queue 216 in volatile memory 212. Specifically, a thread causes a message buffer to be stored in a buffer queue in any way, e.g., by saving the message buffer to the buffer queue, by allowing a service that manages the queue to access a copy of the message buffer, etc.

Buffer queue 216 stores message buffers that hold path-specific intermediate results for paths that require further exploration in database data 272. As they become available for additional work, threads 222A and 222B initiate the first stage of query 102 execution (corresponding to vertex 'a' in the query path pattern) over vertices in database data 272, and initiate more advanced execution stages of query 102 (corresponding to vertices 'b', 'c', and 'd' in the query path pattern) based on message buffers in buffer queue 216. Similarly, buffer queue 246 in volatile memory 242 stores message buffers that hold path-specific intermediate results for paths that require further exploration in database data 274.

Continuing the example with respect to the potential solution path (vertex 302)→(vertex 306), device 240 receives the copy of the message buffer with the record of the completed first execution stage (corresponding to vertex 'a' in the query path pattern) and places the message buffer copy in buffer queue 246. Thread 252A becomes available and initiates second stage processing for query 102 (corresponding to vertex 'b' in the query path pattern) based on information for the message buffer. Specifically, according to the second execution stage of Query 102, thread 252A inserts the 'age' property value of vertex 306 ('age'='40') into a message buffer 420. Thread 252A determines that the neighbor vertices of vertex 306 are vertex 308 (via edge 318) and vertex 322 (via edge 344). As such, thread 252A causes a first copy of the message buffer to be stored in buffer queue 246 with an identifier of vertex 308 and a second copy of the message buffer to be stored in buffer queue 246 with an identifier of vertex 322.

Subsequently, thread 252B picks up the message buffer associated with the identifier of vertex 308 from buffer queue 246. In connection with the third stage of processing for query 102 (corresponding to vertex 'c' in the query path pattern), thread 252B looks up the value of the 'age' property of vertex 308 and inserts this value into message buffer 430. In preparation for the final query execution stage for the path (corresponding to vertex 'd' in the query path pattern), thread 252B sends a copy of message buffer 430 to the owner machines of each neighbor of vertex 308. In this case, vertices 304 and 320 are neighbors to vertex 308 (connected by edges 312 and 330, respectively). Thus, thread 252B sends two copies of message buffer 430 to the owner machine of vertices 304 and 320 (i.e., device 210), where a first copy of the message buffer is associated with an identifier of vertex 304 and a second copy of the message buffer is associated with an identifier of vertex 320. Instance 220 stores the received message buffers in buffer queue 216.

Thread 222A retrieves, from buffer queue 216, message buffer 440 that is associated with the identifier of vertex 304. Thread 222A initiates processing of the final execution stage of query 102 (corresponding to vertex 'd' in the query path pattern) for the indicated path. Specifically, in accordance with the filter WHERE d.age>40 in query 102, thread 222A determines whether the value of the 'age' property of vertex 304 is greater than '40' and only continues with the final stage of query 102 execution for vertex 304 if the 'age' property is larger than '40'. In this case, the 'age' property of vertex 304 is '60'. Thus, at the final stage of query execution, thread 222A inserts the values of 'a.age', 'b.age', and 'd.age', which are the results of the property access-type projected expressions of query 102, into a result table for query 102. Furthermore, thread 222A aggregates, based on the MIN aggregation function, the value of 'c.age' with other values of 'c.age' from any other paths that have been validated for query 102. After all solutions for query 102 have been identified in database 270, the final result for MIN(c.age) is inserted into the result table for query 102.

Prunable Queries

According to one or more embodiments, database server instances use early solution pruning to expedite computation of prunable queries. A prunable query is a query whose results are calculated based on expressions that are prunable, the results of which are unrelated to a number of paths that are explored during query execution. An expression is a construct that expresses how to compute a value, and can be comprised of mathematical functions, literals, vertex and edge property accesses, etc.

Examples of functions for prunable expressions include MAX and MIN aggregation, DISTINCT, and SUM. According to an embodiment, a prunable expression is an expression of the form 'MAX(sub_expression)', 'MIN(sub_expression)', 'SUM(sub_expression)', or 'DISTINCT(sub_expression)', where 'sub_expression' is any other expression. An expression is prunable if all sub-expressions of the expression are prunable. For example, the following expression is prunable because it employs only prunable functions: 'MAX(sub_expression)'+'MIN(sub_expression)

'. A non-prunable expression is an expression whose result is determined by exploring all paths in the applicable graph data set, such as property accesses, count-based aggregation functions such as 'COUNT(sub_expression)' and 'AVG (sub_expression)', etc.

The following queries are examples of prunable queries, where the result of the query is calculated using prunable expressions:

SELECT MAX(a.age) MATCH (a)→(b)→(c)→(d) WHERE d.age>40

Specifically, a database server instance is able to prune a given potential solution path, from a set of potential solutions for the query, if the instance has record of a validated solution path in which the value of 'a.age' was equal to or larger than the value of 'a.age' in the potential solution path.

SELECT SUM(a.age) MATCH (a)→(b)→(c)→(d) WHERE d.age>40

Specifically, a database server instance is able to prune a given potential solution path, from a set of potential solutions for the query, if the value of 'a.age' for the potential solution path is '0'.

SELECT DISTINCT(a.age) MATCH (a)→(b)→(c)→(d) WHERE d.age>40

Specifically, a database server instance is able to prune a given potential solution path, from a set of potential solutions for the query, if the value of 'a.age' for the potential solution path is already in a set of distinct 'a.age' values from solution paths that have been validated for the query.

SELECT MAX(a.age) MATCH (a)→(b)→(c)→(d) GROUP BY b.age WHERE d.age>40

Specifically, a database server instance is able to prune a given potential solution path, from a set of potential solutions for the query, if the instance has record of a validated solution path with the same value of 'b.age' as the potential solution path, in which the value of 'a.age' is equal to or larger than the value of 'a.age' in the potential solution path.

Detecting Prunable Queries

FIG. 5 depicts a flowchart 500 for performing early solution pruning by utilizing expression-specific intermediate results to eliminate, from a set of potential query solutions, paths whose property values cannot influence the final result of the query, according to one or more embodiments. At step 502, a query is executed, as a prunable query, over graph data maintained in a graph database, where the graph data comprises a plurality of vertices and a plurality of edges that represent relationships between the plurality of vertices, where the query includes a prunable expression over a particular vertex property, and where the graph database is maintained, at least in part, by a particular computing device. For example, system 200 receives a query 104 (FIG. 1) over database 270. Query 104 includes the following projected expressions (i.e., the expressions in the SELECT clause of the query), which define the results requested by the user: 'MAX(a.age)', 'SUM(b.age)', and the literal '42'.

According to an embodiment, as part of processing a received query, system 200 determines whether the received query is a prunable query. Specifically, system 200 inspects the projected expressions for the received query, which can range in complexity from literals to complex user-defined functions.

Figure 6:
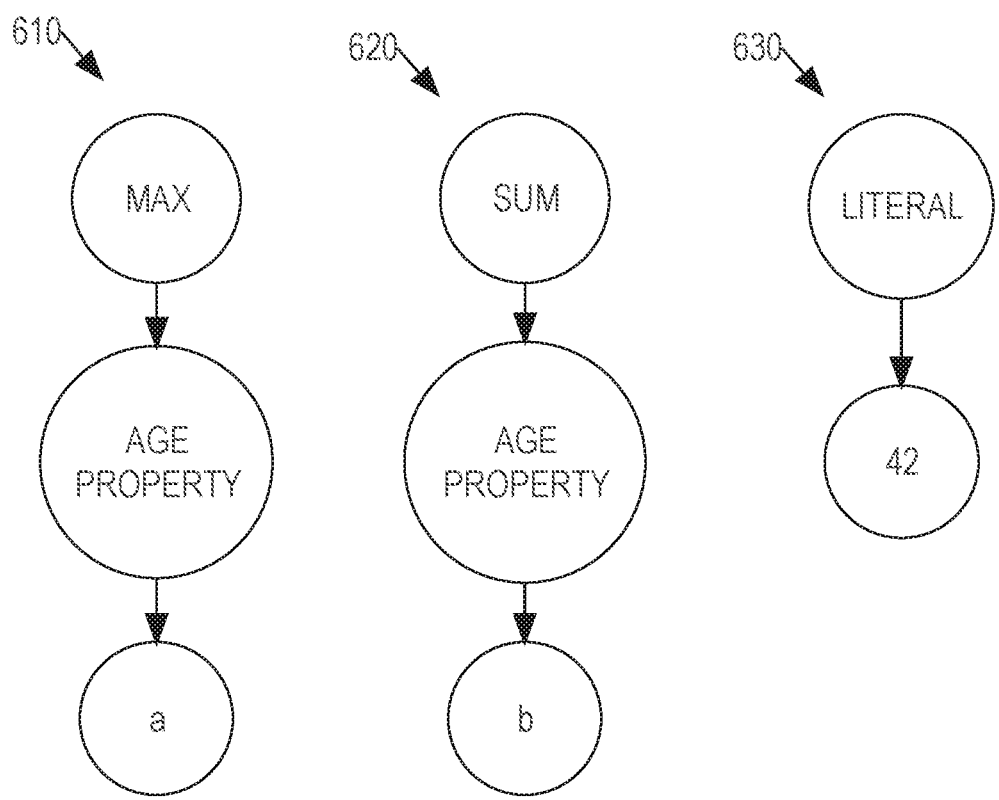
FIG. 6 depicts an example expression tree.

Projected expressions for a query may be represented by system 200 as a set of expression trees. FIG. 6 depicts example expression trees 610, 620, and 630 that represent the projected expressions of query 104. To analyze whether query 104 is prunable, a query optimizer for system 200 traverses the expression tree for each projected expression of query 104 to compute the set of prunable expressions for the query. In the case of query 104, because all of the expressions in the SELECT clause of query 104 are prunable (MAX, SUM, and a literal, which is not affected by the contents of graph database 270), system 200 determines that query 104 is prunable.

In response to determining that a received query is prunable, system 200 determines at which stage, during query execution, the query is eligible for early solution pruning. The determined stage at which the query is eligible for early solution pruning is referred to herein as the "early pruning-eligible" stage. Returning to the example of query 104, system 200 determines that both vertex 'a' and vertex 'b' of the query 104 path pattern must be traversed in order to determine whether a given path may be pruned according to techniques described herein. Specifically, traversal of vertex 'a' is required to determine whether the 'age' property of vertex 'a' affects intermediate results for the MAX function, and traversal of vertex 'b' is required to determine whether the 'age' property of vertex 'b' affects the intermediate results for the SUM function. Thus, system 200 determines that the early pruning-eligible stage for query 104 is the second query execution stage on vertex 'b'.

According to an embodiment, if the early pruning-eligible stage for a query is within a threshold number (e.g., 0) of the last stage of query execution, early pruning is not implemented for the query despite the query being prunable. In the case of query 104, the early pruning-eligible stage is the second of four stages. Based on a threshold number of 0, system 200 determines to utilize early solution pruning techniques for query 104.

A further illustration is presented based on system 200 receiving query 102. As part of processing the received query, system 200 reviews all projected expressions of query 102 to determine whether the query is prunable. A query is not prunable if any number of non-prunable expressions are projected by the query. In the case of query 102, the projected expressions are property access-type expressions targeting 'a.age', 'b.age', 'd.age', and a MIN aggregation function. The property access expressions-type are not prunable, and inclusion of these non-prunable expressions in the projected expressions of query 102 renders the query non-prunable (despite the inclusion of a prunable expression based on the MIN function) given that solutions for query 102 would need to be positively identified and traversed in order to compute the non-prunable projected expressions.

The following example pseudocode (in C++ style) illustrates an operation for detection of prunable queries, by which the list of expressions that can be pruned is known during the compilation of a query:

---

```
set<expression> get_prunable_expressions(vector<expression>
                       projected_expressions) {
    set<expression prunable_expressions;
    bool at_least_one_non_prunable = false;
```

```
        for (expression projected_expression : projected_expressions) {
            prunable_expressions.insert(
                    get_prunable_expressions(projected_expression,
                            at_least_one_non_prunable)
            );
            /* Note that 'at_least_one_non_prunable' is passed by reference to
            the function*/
            if (at_least_one_non_prunable) {
                return set<expression>( );
            }
        }
        return prunable_expressions;
}
set<expression> get_prunable_expressions(expression
                projected_expression, bool &at_least_one_non_prunable) {
        if (projected_expression.type == MAX || projected_expression.type ==
                        MIN || projected_expression.type == SUM ||
                        projected_expression.type == DISTINCT) {
            return set<expression>({projected_expression});
        }
        else if (projected_expression.is_leaf( )) {
            at_least_one_non_prunable = true;
            return set<expression>( );
        }
        set<expression prunable_expressions;
        for (expression child_expression :
                        projected_expression.get_children( )) {
            prunable_expressions.insert_many(get_prunable_expressions(
                            child_expression));
        }
        return prunable_expressions;
}
```

Machine-Local and Thread-Local Intermediate Results

Returning to the discussion of flowchart 500 of FIG. 5, executing a query, as a prunable query, over graph data comprises steps 504-510. Specifically, at step 504, the particular computing device determines that a first path, through the graph data, satisfies the query. For example, after system 200 receives query 104 and determines that it is a prunable query, database server instance 220 initiates the first stage of query 104 against vertices in database data 272 and database server instance 250 initiates the first stage of query 104 against vertices in database data 274. In connection with executing the query, database server instance 250 validates the following path (vertex 302)→(vertex 306)→(vertex 308) as a solution for query 104.

At step 506, based at least in part on a first value, of the particular vertex property, of a vertex in the first path, the particular computing device derives intermediate results for the prunable expression. For example, based on validating path (vertex 302)→(vertex 306)→(vertex 308) as a solution for query 104, instance 250 derives two expression-specific intermediate results indicating the current aggregate values known for the projected expressions in query 104: 'MAX (a.age)'='100'; and 'SUM(b.age)'='40'. These expression-specific intermediate results are used to efficiently compute aggregate values projected by a query, and also to affect early solution pruning, as described in further detail below.

According to an embodiment, the expression-specific intermediate results are maintained in machine-local values, such as machine local values 214 in volatile memory 212 of device 210 and machine-local values 244 in volatile memory 242 of device 240. According to an embodiment, in the case of a distributed graph database system, these machine-local values are periodically synchronized with the machine-local values from other machines in the system. For example, every machine in a distributed database system broadcasts its machine-local values periodically (such as after a predetermined number of updates). When a machine receives a broadcast from another machine indicating an expression-specific intermediate result, the corresponding machine-local value is updated, if needed. For example, for expression-specific intermediate results for a MAX function, the machine-local value that corresponds to the broadcast value is updated if the broadcast value is higher than the machine-local value. These updated expression-specific intermediate values increase the accuracy of the local intermediate values maintained by the various machines of the distributed system, thereby facilitating more effective early pruning of potential solution paths.

According to an embodiment, since query exploration is generally performed in parallel by a large number of threads, each thread running on a given machine avoids contention for machine-local value access by keeping expression-specific intermediate results in thread-local values (such as thread-local values 224A for thread 222A), when possible. Maintenance of thread-local values avoids the requirement to access the machine-local values for every update by every thread. According to an embodiment, to gain performance, thread-local values are periodically synchronized with the corresponding machine-local values. The periodic synchronization may be performed after a certain number of updates by a given thread. Such periodic synchronization allows for a balance between performance and up-to-date intermediate results that provide for discarding the most paths possible via early pruning.

According to an embodiment, intermediate results that are set-type values are stored as machine-local values and not as thread-local values because, in general, it would be too costly and ineffective to have a per-thread set of values. For example, in the case of a DISTINCT-type expression, the set of distinct values required for DISTINCT expression-specific intermediate results is maintained in machine-local values in a way to support concurrent accesses by multiple threads.

Returning to a discussion of step 506 of flowchart 500, in the context of the distributed system 200 of FIG. 2 executing query 104, each device 210 and 240 stores an expression-specific intermediate value for each of 'MAX(a.age)' and 'SUM(b.age)'. When a given instance validates a given path as a solution to query 104, the instance updates the local expression-specific intermediate results maintained by the instance based on the property values of the validated solution. At the end of query execution by a distributed database system, all local values from the machines in the system are used to calculate the final value for each expression projected by the query.

Early Pruning of a Potential Solution Path

At step 508, the particular computing device determines that a second value, of the particular vertex property, of a previously-unexplored vertex in the graph data does not affect the intermediate results for the prunable expression. For example, thread 222A maintains, in thread-local values 224A, the following expression-specific intermediate results for the projected expressions in query 104: 'MAX(a.age)'=='100'; and 'SUM(b.age)'='40'. While maintaining these expression-specific intermediate results, thread 222A performs the first query execution stage for query 104 against vertex 304. Thread 222A determines that the 'age' property of vertex 304, i.e., '60', is less than '100', and thus does not affect the intermediate results for 'MAX(a.age)' stored in machine-local values 224A.

Since the early pruning-eligible stage for query 104 is the second execution stage, thread 222A moves on evaluation of the neighbors of vertex 304 (i.e., vertex 322) according to the second execution stage of query 104. Thus, thread 222A populates a message buffer, as described in further detail below, with the value of the 'age' property of vertex 304 and sends the message buffer with an identifier of vertex 322 to the owner of vertex 322 (device 240). Upon receipt of the message buffer, device 240 places the message buffer in buffer queue 246.

While thread 252A maintains, in thread-local values 254A, 'MAX(a.age)'='100', and 'SUM(b.age)'='40' as the expression-specific intermediate results for the projected expressions in query 104, thread 252A picks up the message buffer from buffer queue 246 and performs the second execution stage for query 104 against vertex 322. At this stage, thread 252A determines that the 'age' property of vertex 322, i.e., '0', does not affect expression-specific intermediate results for 'SUM(b.age)' maintained by thread 252A for query 104. Specifically, a value of '0' for 'b.age' does not affect intermediate results stored for a SUM-type expression no matter the value of the intermediate results.

At step 510, in response to determining that the second value does not affect the intermediate results for the prunable expression, the particular computing device discards the previously-unexplored vertex from a set of potential solutions for the query. For example, because query execution for the current path has reached the early pruning-eligible stage for query 104, and it has been determined that none of the properties of (vertex 304)→(vertex 322) affect the expression-specific intermediate results maintained for the query, thread 252A discards, from the set of potential solutions for query 104, all paths that start with (vertex 304)→(vertex 322).

In this case, discarding this subset of paths from consideration for query 104 prevents instance 250 from having to determine whether vertex 308 is a match for vertex 'c' of the query 104 path pattern, thus saving processing power. Furthermore, instance 250 need not send information for the path exploration to instance 220 to cause instance 220 to explore vertex 320 as a potential match for vertex 'c' of the query 104 path pattern, thus saving processing power and network bandwidth that would be required for that further path exploration.

According to an embodiment, a database server instance prunes message buffers, from the buffer queue maintained by the instance, based on current and/or past pruning decisions. For example, when a thread has detected that a sub-path can be pruned, the thread reviews the pending message buffers and discards those message buffers whose paths start with the pruned sub-path. In this example, a message buffer that matches the pruned sub-path but is placed in the buffer queue after the thread reviews the queue based on the pruned sub-path, the message buffer is not discarded. This technique does not require maintenance of previously-pruned sub-paths, which conserves instance resources.

As a further example, a database server instance maintains (e.g., in a cache) a set of pruned sub-paths based on which message buffers in the message buffer queue may be discarded. The maintained pruned sub-paths are determined based on one of: a pruning decision made by the instance that maintains the set of pruned sub-paths, and/or periodic sharing, by database server instances of a distributed database system of which the instance is a part, of sub-paths that have been pruned, which allows instances to leverage pruning decisions made by other processing entities.

To illustrate proactive pruning of buffer messages based on a cache of saved sub-paths, instance 250 determines that (vertex 304)→(vertex 322) is a pruned sub-path from the set of potential solution paths for query 104 (either based on a pruning decision made by instance 250 or based on information shared by instance 220), and stores the sub-path in a pruned sub-path cache. Instance 250 periodically reviews message buffer queue 246 to determine if any of the message buffers in the queue match a sub-path in the maintained set of pruned sub-paths. The instance discards any message buffer identified to incorporate the pruned sub-path without performing any further processing based on the message buffer.

Group-by

According to techniques described herein, having a GROUP BY clause in a query indicates that the aggregation function associated with the GROUP BY clause will be performed on every distinct group given by an argument of the GROUP BY clause. For instance, the query 'SELECT MAX (a.salary) MATCH (a) GROUP BY a.age' returns the highest salary for each age category. Not having such a GROUP BY clause means that the aggregation is to be performed once on all elements.

Early pruning of a query with a GROUP BY clause is similar to implementation of early pruning techniques for an equivalent query without the GROUP BY clause. For a GROUP BY-based expression, processing entities store sets of local results per 'group', instead of a single local result for the expression.

Further, the early pruning-eligible stage for a query having a GROUP BY clause is at or after a stage at which the required one or more grouping categories have been determined. To illustrate, the following query 'SELECT MAX (a.age) MATCH (a)→(b)→(c) GROUP BY b.age WHERE c.age>40' selects the maximum value of the 'age' property of vertex 'a' for each 'age' property value category of vertex 'b' in cases where the value of the 'age' property of vertex 'c' is over '40'.

For this query, in the absence of the GROUP BY expression and based only on the MAX expression, the early pruning-eligible stage would be the first stage of execution (i.e., the stage that represents exploration of the 'a' vertex in the query path pattern). However, because the GROUP BY expression requires determining groups based on a property of vertex 'b' of the query path pattern, the early pruning-eligible stage is the second stage of execution (i.e., the stage that represents exploration of the 'b' vertex in the query path pattern) to allow expression-specific intermediate results for the query to reflect 'MAX(a.age)' correlated with the age groups of the 'b' vertex.

Because expressions that are affected by a GROUP BY clause produce a set of results, maintenance, in thread-local values, of expression-specific intermediate results for such expressions may be too costly. Thus, according to an embodiment, intermediate results for expressions that are affected by a GROUP BY clause are maintained in machine-local values.

Early Pruning Based on Additional Boolean Flags

According to an embodiment, processing entities include, in message buffers that store path-specific intermediate results for query solution exploration, a boolean flag for each prunable expression in the query. The boolean flags in the message buffer for a particular path are used to communicate, among processing entities, whether property values associated with the boolean flags affected local expression-specific intermediate results. Because each processing entity maintains and updates a respective set of local expression-specific intermediate results for the query, each processing entity may maintain different expression-specific intermediate results between periodic synchronization events. Including such flags in message buffers allows for discarding the maximum number of solution paths that cannot affect query results.

A flag in a given message buffer is set to TRUE if the associated message buffer variable would affect the corresponding expression-specific intermediate result maintained by the current processing entity and all previous processing entities. Thus, the presence of a flag set to TRUE in a message buffer for a given path indicates that there is a chance that the property values of the path could change the final results of the query.

Conversely, a flag in a given message buffer has a value of FALSE if the value of the associated message buffer variable would not affect the corresponding expression-specific intermediate result maintained by a previous or current processing entity. It is noted that, if the value of a path property does not affect a local expression-specific intermediate result, the value necessarily does not affect the final result for the expression. If, upon completion of the early pruning-eligible stage of a query for a given path, all of the flags in the message buffer maintained for the path are FALSE, then the potential solution path may safely be discarded from the set of possible query solutions because the values of the path cannot affect the final query result.

At every processing stage, the processing entity for that stage attempts to set any TRUE flags in the message buffer to FALSE, i.e., the processing entity sets a TRUE flag to FALSE when the property value associated with the flag does not affect the corresponding expression-specific intermediate results maintained by the current processing entity. This additional optimization is not costly since the previously identified values required for prunable expressions from a given path are stored in the message buffer maintained for the path. Furthermore, the verification required for additional pruning is inexpensive in terms of computation since such verification involves one of: (a) a comparison between locally-stored expression-specific intermediate results and a value (for MAX and MIN); (b) a comparison between a value and 0 (for SUM); or (c) an 'exists' test to determine if a value is in a set of values for an expression-specific intermediate result (for DISTINCT).

Once a boolean flag is set to FALSE, subsequent processing entities leave the flag as FALSE, even if the associated message buffer variable would change the corresponding expression-specific intermediate results maintained by the current processing entity. According to an embodiment, when a property value in a received message buffer, which is associated with a flag that is set to FALSE, would change the corresponding expression-specific intermediate results maintained by a current processing entity, the entity updates the expression-specific intermediate results based on the property value (thereby increasing the processing entity's power to discard future potential solution paths). The local expression-specific intermediate results may be safely updated because the property value, on which the update is based, is necessarily a value that would not affect the final results for the corresponding prunable expression, as determined by one of the previous processing entities. Such an update can be safely performed even if the path is later discarded (either by early pruning or because of a query filter) because it is based on intermediate results from another processing entity.

To illustrate, when executing query 104, compilation of the query by system 200 identifies three execution stages for query 104, one for each vertex in the query 104 path pattern. FIG. 7 depicts message buffers 702, 704, and 706, including boolean flags, at the three execution stages for evaluation of query 104. The legend depicted in FIG. 4 is also applicable to FIG. 7. A message buffer 702 is created upon initiation of the first execution stage of query 104 over a given vertex, with a message buffer variable storing the value of the 'age' property of the vertex and a corresponding boolean message buffer variable with the flag indicating whether the associate value affected the corresponding expression-specific intermediate value maintained by the processing entity. When a processing entity initiates the second execution stage of query 104, the processing entity inserts, into message buffer 704, a message buffer variable with the value of the 'age' property of the vertex being evaluated as the 'b' vertex in the query 104 path pattern, and also a corresponding boolean message buffer variable with the flag for the stored 'b.age'. (According to another embodiment, a boolean flag is not used for SUM-type expressions given that the value of 'b.age' is sufficient to determine whether the value affected the intermediate results maintained by a previous processing entity.) When a processing entity initiates the third execution stage of query 104 based on message buffer 706, any values for vertex 'c' of the query 104 path pattern would not need to be sent to any other processing entity and, as such, are not included in the message buffer.

To illustrate utilization of flags for execution of query 104 in the context of database data 272 and 274 as depicted in FIG. 3, thread 252A maintains the following expression-specific intermediate results for query 104: 'MAX(a.age)'=='100'; 'SUM(b.age)'=='40'. These intermediate results may be maintained in thread-local values 254A, or may be maintained in machine-local values 244.

While maintaining those expression-specific intermediate results, thread 252A initiates the first execution stage for query 104 against vertex 306. Thread 252A determines that the 'age' property of vertex 306 does not change the local intermediate results for 'MAX(a.age)' since the expression-specific intermediate results show a 'MAX(a.age)' of '100' and the 'age' property of vertex 306 is '40'. As such, as shown in message buffer 712 at the first stage of query 104 execution, thread 252A populates message buffer 712 with a variable 712A that indicates an 'a.age' value of '40', and also sets an associated boolean message buffer variable 712B to FALSE. The flag at variable 712B shows that message buffer variable 712A does not affect the local expression-specific intermediate results for 'MAX(a.age)' that is maintained by thread 252A.

Thread 252A identifies vertex 322 as a neighbor of vertex 306, and a potential match for vertex 'b' of the query 104 path pattern. Thus, thread 252A causes message buffer 712 to be stored in buffer queue 246 with an identifier of vertex 322. Thread 252B picks up the message buffer 714 from buffer queue 246 and performs the second stage of query execution against vertex 322. At the time that thread 252B performs the second stage of execution for query 104, thread 252B maintains the following expression-specific intermediate values for query 104 in thread-local values 254B: 'MAX(a.age)'=='20'; 'SUM(b.age)'=='60'. In this example, thread-local values 254B are different from thread-local values 254A because one or both of the thread-local values have changed since they were initialized or since they were last synchronized to machine-local values 244.

Thread 252B determines that the buffer variable 714A in message buffer 714 is higher than the expression-specific intermediate value for 'MAX(a.age)' in thread-local values 254B. Thread 252B does not change the flag in buffer variable 714B (associated with buffer variable 714A), since the flag indicates that the 'a.age' stored in buffer variable 714A did not affect the expression-specific intermediate value for 'MAX(a.age)' of the previous processing entity. According to an embodiment, based on this determination, thread 252B updates the expression-specific intermediate value for 'MAX(a.age)' in thread-local values 254B based on the value for 'a.age' in buffer variable 714A, i.e., 'MAX (a.age)'=='40'. The expression-specific intermediate results maintained by thread 252B may be safely updated based on this information because the value of 'a.age' in the buffer variable 714A is necessarily less than or equal to the intermediate results for 'MAX(a.age)' maintained by the previous processing entity.

Thread 252B also determines that the value of the 'age' property of vertex 322, i.e., '0, does not affect the intermediate results maintained in thread-local values 254B, i.e., 'SUM(b.age)'=='60'. Since the current (second) stage of execution for query 104 is the early pruning-eligible stage for the query, and because neither of the age properties of the explored vertices affect the local expression-specific intermediate results for the query, thread 252B discards all paths, from the potential path matches for query 104, that start with (vertex 306)→(vertex 322). Thread 252B need not update message buffer 714 with the results of the second execution stage given that the path is pruned from the set of potential solutions for query 104, and the message buffer is not used to perform any further stages of query 104 execution.

As a further example, while thread 252B maintains expression-specific intermediate results for query 104 of 'MAX(a.age)'=='40'; 'SUM(b.age)'=='60', thread 252B initializes the first stage of query 104 evaluation against vertex 308. Thread 252B determines that the value of the 'age' property of vertex 308, i.e., '50', would affect the expression-specific intermediate results in thread-local values 254B for 'MAX(a.age)', i.e., 'MAX(a.age)'=='40'. Thread 252B populates a message buffer 722 (FIG. 7) with a message buffer variable 722A indicating 'a.age'=='50'. Thread 252B further inserts a message buffer variable 722B with a boolean flag set to TRUE, which indicates that the value of 'a.age' in buffer variable 722A affected the expression-specific intermediate results maintained by thread 252B.

Thread 252B identifies vertex 320, maintained in database data 272, as a neighbor of vertex 308 that is a possible candidate to match the 'b' vertex of the query 104 path pattern. Accordingly, thread 252B sends a copy of message buffer 722, with an identifier of vertex 320, to database server instance 220. Instance 220 places the copy of the message buffer in message buffer queue 216.

Thread 222A picks up the copy of the message buffer (depicted in FIG. 7 as message buffer 724) based on which the thread will perform the second phase of query 104 execution against vertex 320. When thread 222A picks up the message buffer, thread-local values 224A indicate the following expression-specific intermediate values for query 104: 'MAX(a.age)'=='100'; 'SUM(b.age)'=='110'. Thread 222A determines that the value of 'a.age' in message buffer variable 724A, i.e., '50', does not affect the expression-specific intermediate results for 'MAX(a.age)' maintained by thread 222A. Based on this determination, thread 222A changes the flag in buffer variable 724B, associated with 'a.age', to FALSE.

Thread 222A then performs the second execution phase of query 104 against vertex 320. The value of the 'age' property of vertex 320 is '20', which, as a non-zero number, would affect the expression-specific intermediate results for 'SUM (b.age)' maintained by thread 222A, i.e., '110'. The second stage of execution of query 104 is the early pruning-eligible stage. However, because one of the values of the currently-explored path affects the intermediate results maintained by the processing entities for path, the current path is not pruned. Thus, thread 222A populates message buffer 724 with the value of 'b.age' ('20') in buffer variable 724C, and a boolean flag set to TRUE in buffer variable 724D to indicate that the value in buffer variable 724C affected the expression-specific intermediate results for 'SUM(b.age)'.

Thread 222A identifies vertex 304 (maintained by instance 220) as a neighbor of vertex 320 that is a potential match for vertex 'c' in the query 104 path pattern. As such, thread 222A causes a copy of message buffer 724, associated with an identifier of vertex 304, to be stored in buffer queue 216.

Thread 222B picks up the copy of the message buffer (depicted in FIG. 7 as message buffer 726) from message buffer queue 216 based on which thread 222B performs the third execution stage of query 104 for the current path. Specifically, the value of the 'age' property of vertex 304 is '60', and, as such, vertex 304 satisfies the condition on vertex 'c' in query 104, i.e., 'c.age>40'. Based on this determination, thread 222B validates the path (vertex 308)→(vertex 320)→(vertex 304) as a solution to query 104.

According to an embodiment, when a path is validated as a solution to the query, the expression-specific intermediate results maintained, by the processing entity of the final query execution stage, are updated to reflect any changes caused by the property values of the validated path. For example, based on validating the path (vertex 308)→(vertex 320)→(vertex 304) as a solution to query 104, thread 222B updates the expression-specific intermediate results maintained by the thread based on the property values in the validated path. When all potential solution paths for query 104 have been explored by system 200, the results maintained by the processing entities are shared, and the final values of 'MAX (a.age)' and 'SUM(b.age)' are computed and returned as a result of query 104.

According to an embodiment, a processing entity that processes a query execution stage after the early pruning-eligible stage of a query determines whether the values in the path-specific intermediate results would affect the expression-specific intermediate results maintained by that processing entity. The processing entity updates the flags in the message buffer if some, but not all, values marked with a TRUE flag would not affect the expression-specific intermediate values maintained by the processing entity. Further, the processing entity prunes the path from the set of potential solutions for the query (at the later query execution stage) if all of the message buffer variables associated with TRUE flags would not affect the intermediate results maintained by the entity. This optimization saves processing power required to perform further query evaluation, and is especially useful if there are multiple processing stages required to be performed after the early pruning-eligible processing stage.

The following pseudocode illustrates the technique of pruning for previously-computed values:

```
// Returns true iff the path exploration needs to be continued
bool update_prunable_flags(set<expression> prunable_expressions,
                buffer query_buffer) {
    if (prunable_expressions.empty( )) {
        return true;
    }
    bool need_to_continue_path = false;
    for (expression prunable_expression : prunable_expressions) {
        if (query_buffer.get_flag(prunable_expression) == true) {
            // Value would change all previous local values
            if (prunable_expression.get_local_value( ).would_be_changed(
                    query_buffer.get_value (prunable_expression)))
            {
                need_to_continue_path = true;
            } else {
                query_buffer.set_flag(prunable_expression, false);
            }
        }
    }
    return need_to_continue_path;
}
```

The following is pseudocode describing the implementation of verifying whether a path is prunable after evaluation of prunable expressions, i.e., at the early pruning-eligible stage:

```
// Returns true iff the path exploration needs to be continued
bool verify_prunable_after_evaluation(expression evaluated_expression,
                value evaluated_value, set<expression>
                prunable_expressions, buffer query_buffer) {
    if (!evaluated_expression.is_prunable( )) {
        return true;
    }
    query_buffer.set_value(evaluated_expression, evaluated_value);
    if (evaluated_expression.get_local_value( ).would_be_changed(
            evaluated_value)) {
        query_buffer.set_flag(evaluated_expression, true);
        return true;
    } else {
        query_buffer.set_flag(evaluated_expression, false);
        for (expression prunable_expression : prunable_expressions) {
            if (query_buffer.get_flag(prunable_expression) == true) {
                // Value would change all previous local values
                return true;
            }
        }
        return false;
    }
}
```

Query Planning & Optimization

For simplicity of illustration herein, no additional query optimizations, such as reordering of explored vertices, are described. However, query optimization is orthogonal to techniques described herein, and may be implemented as desired in connection with techniques described herein. For example, when integrating early solution pruning techniques described herein into a database management system, the query optimizer of the system should be carefully modified to integrate early pruning techniques with existing optimizations, such as vertex match re-ordering and utilization of indices. In many instances, the benefits from techniques described herein are amplified when solution path explorations start at (or close to) a vertex on which a prunable result is computed.

To illustrate, when optimizing query 104 (FIG. 1), a query optimizer might choose to start the path exploration from vertex 'c' of the query path pattern because this vertex is associated with a filter in the query. In this case, the query optimizer uses reverse edges to go to vertices 'b' and 'a' in the query pattern.

If such an optimization is applied, early pruning could not be used. However, for example, if the query optimizer has information that all vertices in the graph data have a value of the 'age' property that is larger than 40, and that there is a large range of different values for the 'age' property, the query optimizer may decide that it would be more beneficial to execute the query starting at vertex 'a' in the query pattern, and to use an early pruning optimization. In this example, reordering the query would not optimize query execution because the filter c.age>40 is true for all vertices in the graph data, and the existence of different values of the 'age' property means that there will likely be many opportunities to prune the query early.

Database System Configuration

A database client, not depicted in FIG. 2, connects to database system 200. The client may comprise a database application running on a client node. The client interacts with an instance of database system 200, such as one of instances 220 and 250, by submitting commands that cause the instance to perform operations on data stored in the database. For example, a command may be a request to access or modify data from the database, perform operations on the data, and/or return the data to the client.

Typically, distributed database system 200 is implemented by multiple machines (including device 210 and device 240) that are remotely connected. Referring to FIG.

2, database server instance 220, running on device 210, maintains first database data 272 in persistent storage 230, and database server instance 250, running on device 240, maintains second database data 274 in persistent storage 260. Both database data 272 and database data 274 include graph database data for database 270.

According to an embodiment, devices 210 and 240 correspond to clustered machines known as nodes, each running a database server instance, as described above. A database server instance (or "instance") is a server that comprises a combination of the software and allocation of resources from a machine node. Specifically, a server, such as a database server, or any other process is a combination of integrated software components and an allocation of computational resources, such as memory, a node (i.e., a computing device and/or memory accessible to the computing device), and/or sub-processes on the node for executing the integrated software components on a processor, the combination of the software and computational resources being dedicated to performing a particular function on behalf of one or more clients. Instances 220 and 250 collectively implement server-side functions of distributed database system 200.

Database data 272 and 274 may each reside in volatile and/or non-volatile storage, such as first volatile memory 212, second volatile memory 242, first persistent storage 230, and second persistent storage 260. Each node implementing distributed database system 200 may include a virtual disk and/or a set of physical disks. Additionally or alternatively, database data 272 and 274 may each be stored, at least in part, in main memory of a database server computing device.

Database data for database 270 may be stored in any type of computer-readable storage media, such as flash storage or non-volatile memory. In some embodiments, database 270 is a distributed database comprising a plurality of databases each stored in a respective one or more storage media. In other embodiments, machines implementing the database system have shared access to database 270 via shared access to storage storing database data for database 270.

One or more of the functions attributed to any process described herein, may be performed any other logical entity that may or may not be depicted in FIG. 2, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
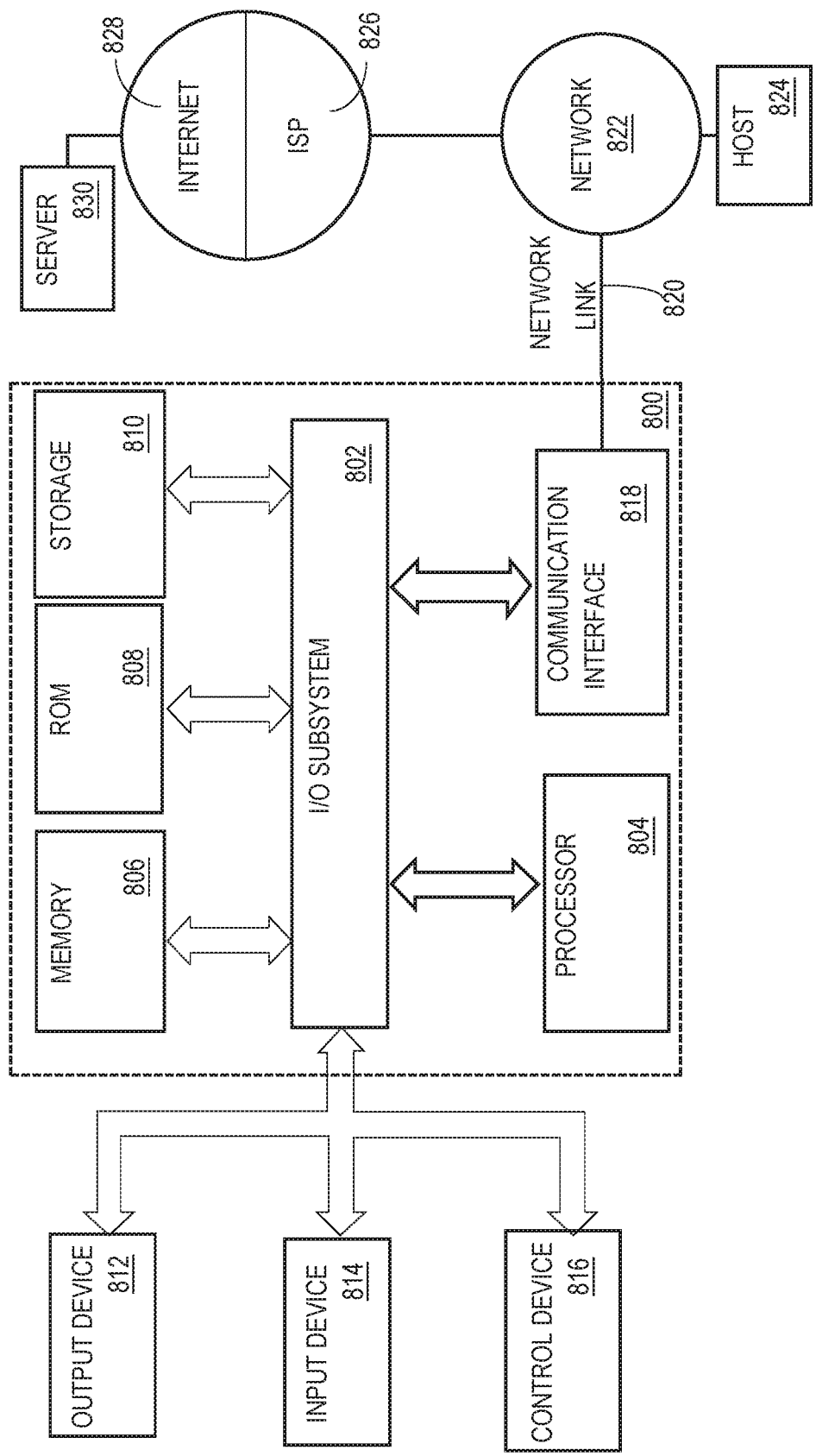
FIG. 8 is a block diagram of a computer system on which embodiments may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
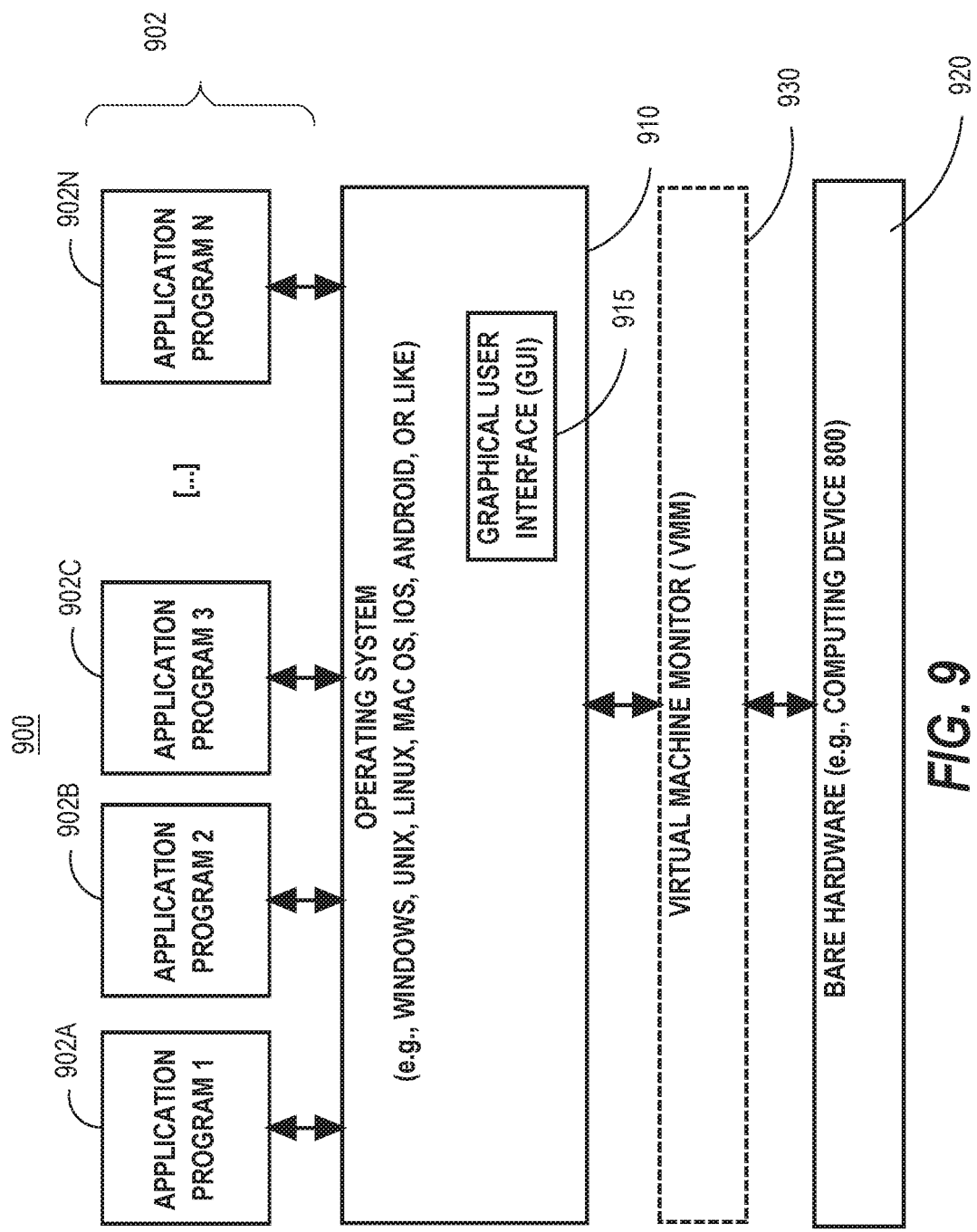
FIG. 9 depicts a software system that may be used in an embodiment.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   executing a query over graph data maintained in a graph database;
   wherein the graph data comprises a plurality of data items comprising: a plurality of vertices and a plurality of edges that represent relationships between the plurality of vertices;
   wherein the query includes a prunable expression over a particular data item property;
   wherein the graph database is maintained, at least in part, by a particular computing device;
   wherein executing the query over the graph data comprises:
   the particular computing device determining that a first path, through the graph data, satisfies the query;
   based at least in part on a first value, of the particular data item property, of a data item in the first path, the particular computing device deriving intermediate results for the prunable expression;
   the particular computing device determining that a second value, of the particular data item property, of a previously-unexplored data item in a second path through the graph data does not affect the intermediate results for the prunable expression;
   in response to determining that the second value does not affect the intermediate results for the prunable expression, the particular computing device discarding the second path from a set of potential solutions for the query.

2. The computer-executed method of claim 1, wherein data for the second path, including the second value, is stored in storage that is local to the particular computing device.

3. The computer-executed method of claim 1, wherein:
   the graph database is a distributed graph database that is maintained by a plurality of computing devices that includes the particular computing device and a second computing device;
   the second path includes edge data that refers to a particular vertex stored by the second computing device; and
   exploring the second path, for the query, requires communicating intermediate results between the particular computing device and the second computing device.

4. The computer-executed method of claim 1, wherein the prunable expression is of a type included in a group of prunable expression types comprising: max-type expressions, min-type expressions, sum-type expressions, and distinct-type expressions.

5. The computer-executed method of claim 4, wherein:
   the query includes one or more expressions; and
   the method further comprises determining whether the query is prunable by:
   determining that types of the one or more expressions are included in the group of prunable expression types, and determining that there are no expressions, in the query, having a type that is not included in the group of prunable expression types;
executing the query is performed in response to determining that the query is prunable.

6. The computer-executed method of claim 5, wherein the one or more expressions, in the query, are sub-expressions to an expression in the query.

7. The computer-executed method of claim 1, wherein executing the query over the graph data further comprises:
the particular computing device determining that a third value, of the particular data item property, of a third path in the graph data affects the intermediate results for the prunable expression;
in response to determining that the third value affects the intermediate results for the prunable expression, the particular computing device causing one or more edges, from the third path in the graph data, to be traversed for the query.

8. The computer-executed method of claim 7, wherein causing the one or more edges, from the third path in the graph data, to be traversed for the query comprises storing, in a message buffer, at least the third value and information indicating that the third value affected the intermediate results for the prunable expression.

9. The computer-executed method of claim 1, wherein:
the prunable expression is a first prunable expression;
the query comprises a second prunable expression over a second data item property;
the graph database is a distributed graph database that is maintained by a plurality of computing devices that includes the particular computing device; and
executing the query over the graph data further comprises:
a first thread, running on a computing device of the plurality of computing devices, populating a message buffer with, at least, a value of the second data item property and a flag that indicates whether the value of the second data item property affects intermediate results maintained by the first thread;
a second thread, running on the particular computing device:
receiving the message buffer;
performing said discarding the second path from the set of potential solutions for the query in response to both determining that the second value does not affect the intermediate results for the prunable expression and determining that the flag, of the message buffer, indicates that the value of the second data item property does not affect intermediate results maintained by the first thread.

10. The computer-executed method of claim 1, wherein:
the prunable expression is a first prunable expression;
the query comprises a second prunable expression over a second data item property;
the graph database is a distributed graph database that is maintained by a plurality of computing devices that includes the particular computing device; and
executing the query over the graph data further comprises:
a first thread, running on a computing device of the plurality of computing devices, populating a message buffer with, at least, a value of the second data item property and a flag that indicates that the value of the second data item property affects intermediate results maintained by the first thread;
a second thread, running on the particular computing device:
maintaining second intermediate results for the second prunable expression,
receiving the message buffer,
determining that the flag, in the message buffer, indicates that the value of the second data item property affects intermediate results maintained by the first thread,
in response to determining that the flag, in the message buffer, indicates that the value of the second data item property affects intermediate results maintained by the first thread, determining whether the value of the second data item property, in the message buffer, affects the second intermediate results for the second prunable expression, and
in response to determining that the value of the second data item property, in the message buffer, does not affect the second intermediate results for the second prunable expression maintained by the second thread, the particular computing device changing the flag to indicate that the value of the second data item property, in the message buffer, does not affect intermediate results.

11. The computer-executed method of claim 1, wherein the query is a first query, the method further comprising:
receiving a second query over the graph data;
determining that the second query includes at least one expression that is non-prunable;
in response to determining that the second query includes at least one expression that is non-prunable, executing the second query, over the graph data, as a non-prunable query.

12. One or more non-transitory computer-readable media storing instructions that, when executed by one or more processors, cause:
executing a query over graph data maintained in a graph database;
wherein the graph data comprises a plurality of data items comprising: a plurality of vertices and a plurality of edges that represent relationships between the plurality of vertices;
wherein the query includes a prunable expression over a particular data item property;
wherein the graph database is maintained, at least in part, by a particular computing device;
wherein executing the query over the graph data comprises:
the particular computing device determining that a first path, through the graph data, satisfies the query;
based at least in part on a first value, of the particular data item property, of a data item in the first path, the particular computing device deriving intermediate results for the prunable expression;
the particular computing device determining that a second value, of the particular data item property, of a previously-unexplored data item in a second path through the graph data does not affect the intermediate results for the prunable expression;
in response to determining that the second value does not affect the intermediate results for the prunable expression, the particular computing device discarding the second path from a set of potential solutions for the query.

13. The one or more non-transitory computer-readable media of claim 12, wherein data for the second path, including the second value, is stored in storage that is local to the particular computing device.

14. The one or more non-transitory computer-readable media of claim 12, wherein:
the graph database is a distributed graph database that is maintained by a plurality of computing devices that includes the particular computing device and a second computing device;
the second path includes edge data that refers to a particular vertex stored by the second computing device; and
exploring the second path, for the query, requires communicating intermediate results between the particular computing device and the second computing device.

15. The one or more non-transitory computer-readable media of claim 12, wherein the prunable expression is of a type included in a group of prunable expression types comprising: max-type expressions, min-type expressions, sum-type expressions, and distinct-type expressions.

16. The one or more non-transitory computer-readable media of claim 15, wherein:
the query includes one or more expressions; and
the instructions further comprise instructions that, when executed by one or more processors, cause determining whether the query is prunable by:
determining that types of the one or more expressions are included in the group of prunable expression types, and
determining that there are no expressions, in the query, having a type that is not included in the group of prunable expression types;
executing the query is performed in response to determining that the query is prunable.

17. The one or more non-transitory computer-readable media of claim 16, wherein the one or more expressions, in the query, are sub-expressions to an expression in the query.

18. The one or more non-transitory computer-readable media of claim 12, wherein executing the query over the graph data further comprises:
the particular computing device determining that a third value, of the particular data item property, of a third path in the graph data affects the intermediate results for the prunable expression;
in response to determining that the third value affects the intermediate results for the prunable expression, the particular computing device causing one or more edges, from the third path in the graph data, to be traversed for the query.

19. The one or more non-transitory computer-readable media of claim 18, wherein causing the one or more edges, from the third path in the graph data, to be traversed for the query comprises storing, in a message buffer, at least the third value and information indicating that the third value affected the intermediate results for the prunable expression.

20. The one or more non-transitory computer-readable media of claim 12, wherein:
the prunable expression is a first prunable expression;
the query comprises a second prunable expression over a second data item property;
the graph database is a distributed graph database that is maintained by a plurality of computing devices that includes the particular computing device; and
executing the query over the graph data further comprises:
a first thread, running on a computing device of the plurality of computing devices, populating a message buffer with, at least, a value of the second data item property and a flag that indicates whether the value of the second data item property affects intermediate results maintained by the first thread;
a second thread, running on the particular computing device:
receiving the message buffer;
performing said discarding the second path from the set of potential solutions for the query in response to both determining that the second value does not affect the intermediate results for the prunable expression and determining that the flag, of the message buffer, indicates that the value of the second data item property does not affect intermediate results maintained by the first thread.

21. The one or more non-transitory computer-readable media of claim 12, wherein:
the prunable expression is a first prunable expression;
the query comprises a second prunable expression over a second data item property;
the graph database is a distributed graph database that is maintained by a plurality of computing devices that includes the particular computing device; and
executing the query over the graph data further comprises:
a first thread, running on a computing device of the plurality of computing devices, populating a message buffer with, at least, a value of the second data item property and a flag that indicates that the value of the second data item property affects intermediate results maintained by the first thread;
a second thread, running on the particular computing device:
maintaining second intermediate results for the second prunable expression,
receiving the message buffer,
determining that the flag, in the message buffer, indicates that the value of the second data item property affects intermediate results maintained by the first thread,
in response to determining that the flag, in the message buffer, indicates that the value of the second data item property affects intermediate results maintained by the first thread, determining whether the value of the second data item property, in the message buffer, affects the second intermediate results for the second prunable expression, and
in response to determining that the value of the second data item property, in the message buffer, does not affect the second intermediate results for the second prunable expression maintained by the second thread, the particular computing device changing the flag to indicate that the value of the second data item property, in the message buffer, does not affect intermediate results.

22. The one or more non-transitory computer-readable media of claim 12, wherein the query is a first query, and the instructions further comprise instructions that, when executed by one or more processors, cause:
receiving a second query over the graph data;
determining that the second query includes at least one expression that is non-prunable;
in response to determining that the second query includes at least one expression that is non-prunable, executing the second query, over the graph data, as a non-prunable query.

* * * * *